UNITED STATES PATENT OFFICE.

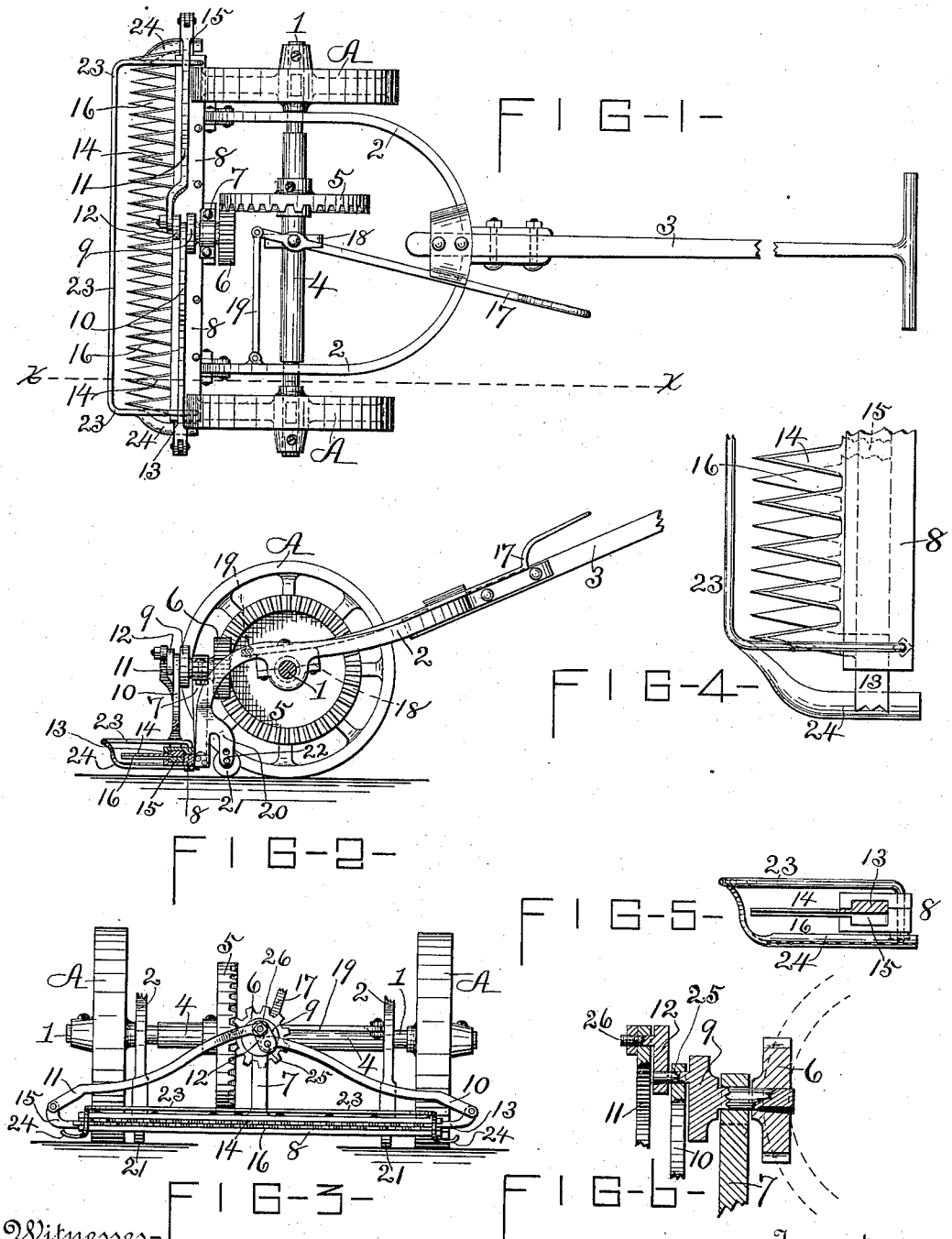

ELMER E. JOHNSON, OF HERKIMER, NEW YORK, ASSIGNOR OF TWO-THIRDS TO HERBERT L. JOHNSON AND DUANE C. JOHNSON, BOTH OF SAME PLACE.

LAWN-MOWER.

SPECIFICATION forming part of Letters Patent No. 385,272, dated June 26, 1888.

Application filed February 2, 1888. Serial No. 262,694. (No model.)

*To all whom it may concern:*

Be it known that I, ELMER E. JOHNSON, of Herkimer, county of Herkimer, in the State of New York, a citizen of the United States, have invented certain new and useful Improvements in Lawn-Mowers, of which the following is a specification, reference being had to the accompanying drawings, in which—

Figure 1 is a top plan view of machine in gear; Fig. 2, a sectional elevation taken on line $x$ $x$, Fig. 1; Fig. 3, a front elevation; Fig. 4, an enlarged detail of cutting-gear and appurtenances; Fig. 5, an end elevation of Fig. 4, and Fig. 6 an enlarged vertical section of the drive-pinion and its arbor and connections.

Similar letters and figures of reference indicate corresponding parts throughout the several views.

My invention relates to that class or subdivision of mowers in which two sets of knives operating horizontally and reciprocally are used; and my object is to produce an improved forward-cut machine of the above class and of simple construction.

My invention consists in the several novel features of construction and operation hereinafter described, and which are specifically set forth in the several clauses of claim hereunto annexed.

It is constructed as follows:

A A are the main supporting and drive wheels secured to the axle 1, which is mounted in the frame 2, to which the handle 3 is secured. The central part of the axle 1 is enlarged at 4, and the whole rotates with the drive-wheels. Upon this enlargement I secure the driving-gear 5, which is adapted to engage with the driving-pinion 6, secured upon a shaft journaled in the top of the standard 7, set vertically upon the finger-bar 8, substantially centrally. The frame 2 is also secured to the cutter-bar, as shown.

Upon the front end of the pinion-shaft I secure the disk 9, having a pin, 25, projecting from its front face at one side of the center, upon which the pitman-rod 10 is journaled, and upon this pin the eccentric 12 is secured, which is provided with a pin, 26, on which the pitman 11 is journaled, and the pitman 11 is bent, as shown, in order to bring the outer ends of the two pitmen in line.

The outer end of pitman 10 is coupled onto an arm upon the outer end of the knife-bar 13, which is provided with the shearing knives or sections 14, and the pitman 11 is in like manner coupled to the knife-bar 15, provided with like knives or sections 16. These knife-bars lie 13 upon 15, and the cutting-edges of the knives are adapted to meet with a shear cut reciprocally as the bars reciprocate through the pitmen with the rotation of the pinion, pinion-shaft, and disk 9. A lever, 17, is connected to the collar 18, which is mounted upon the enlargement 4 of the axle 1, so that the axle can rotate therein, while the collar is secured thereon, so that it cannot slide, by any ordinary device. The front arm of this lever is connected to the rod or bar 19, which is secured to the frame 2, substantially as shown.

In Fig. 1 I show the mower in gear ready for cutting, and to throw it out of gear I push the lever over toward the handle 3, which operation slides the frame along on the axle, thus carrying with it the finger-bar and the standard 7, and this throws the drive-pinion 6 out of gear with the driving-gear 5.

Upon a bracket, 20, secured to or integral with each arm of the frame 2, as clearly shown in Fig. 2 of the drawings, I mount a roller, 21, adjustable vertically by changing its arbor from one arbor-hole 22 to another, in order to regulate the height of the cut of the knives above the ground. The finger-bar 8 is constructed with a rectangular (or other formed) slotway to receive the knife-bars, and is either wholly or partially inclosed, which slotway holds and guides the knife-bars longitudinally. To this finger-bar I secure, also, the guard 23, which projects out beyond the knife-points and horizontally across in front of them and a little above them; and 24 is a clearer at each end of the guard, said clearer being secured at its neck portion to the guard, while its enlarged horizontal portion is carried beneath or adjacent to the end of the finger-bar to prevent clogging of the adjacent end of the finger-bar and protruding reciprocating knife-bars and knives thereon by grass, &c., the outer portion of the clearer having an upwardly-curved edge, as clearly illustrated in Figs. 4 and 5 of the drawings.

Having described my invention, what I claim as new, and desire to secure by Letters Patent, is—

1. A lawn-mower consisting of main drive-wheels secured upon an axle, a drive-gear upon the axle, a drive-pinion upon an arbor journaled in a standard erected upon the finger-bar, a disk secured upon the pinion-arbor and provided with a projecting pitman-arbor, an eccentric upon said arbor provided with a pitman-arbor, said pitman-arbors standing diametrically opposite each other, independent pitmen journaled at one end upon the arbors and at the other end to separate knife-bars, a finger-bar slotted longitudinally to receive the knife-bars, the separate knife-bars provided with knives, a knife-guard secured to the finger-bar at its extremities, said guard projecting out beyond the knife-points and horizontally across in front of and above them, clearers arranged at the sides of the guard and connected to it, said clearers being adjacent to the ends of the finger-bar and reciprocating knife-bars, a frame secured to the finger-bar and journaled upon the supporting and driving axle, rollers adjustably mounted in brackets connected to the downwardly-projecting arms of the frame, and a shifting-lever pivoted to a collar loosely mounted on the enlarged portion of the axle and pivotally secured to a rod pivoted to a side of the frame, whereby the frame is adapted to slide a suitable distance upon the contracted extremities of the axle at points situated between the shoulders formed by the enlarged portion of the axle and the hubs of the supporting-wheels, all constructed and operating together, substantially as described and shown, and for the purposes specified.

2. The combination of the finger-bar provided with the guard 23, secured thereto, as shown, said guard projecting out beyond the knife-points and horizontally across in front of and above them, and clearers 24, arranged at the sides of the guard and adjacent to the ends of the finger-bar and reciprocating knife-bars, and connected to the aforesaid guard, and rollers 20, connected to the frame, and the finger-bar with the reciprocating knives, knife-bars sliding in the finger-bar, and pitmen connected to the knife-bars, substantially as described.

3. The combination of the guard 23, secured to the finger-bar at its extremities, and clearers 24, arranged adjacent to the ends of said finger-bar and reciprocating knife-bars and connected to the guard at its sides, and the finger-bar with the reciprocating knives, knife-bars sliding in the finger-bar, and the pitmen connected to the knife-bars, substantially as described.

4. The guard 23, projecting out beyond the knife-points and horizontally across in front of and above them and secured to the finger-bar, and a clearer, 24, arranged at either side of the guard and adjacent to the ends of the finger-bar and knife-bars, and connected to said guard at its sides, in combination with the finger-bar 8, carrying the knife-bars and knives, substantially as described.

In witness whereof I have hereunto set my hand this 11th day of January, 1888.

ELMER E. JOHNSON.

Witnesses:
H. L. JOHNSON,
WM. C. RAYMOND.